Feb. 27, 1945. M. BONOTTO 2,370,138
PROCESSES AND APPARATUS FOR FILTERING MISCELLA AND LIKE MIXTURES
THROUGH A FILTERING MEDIUM OF SOLID OIL-BEARING MATERIAL
Filed June 17, 1939 3 Sheets-Sheet 3
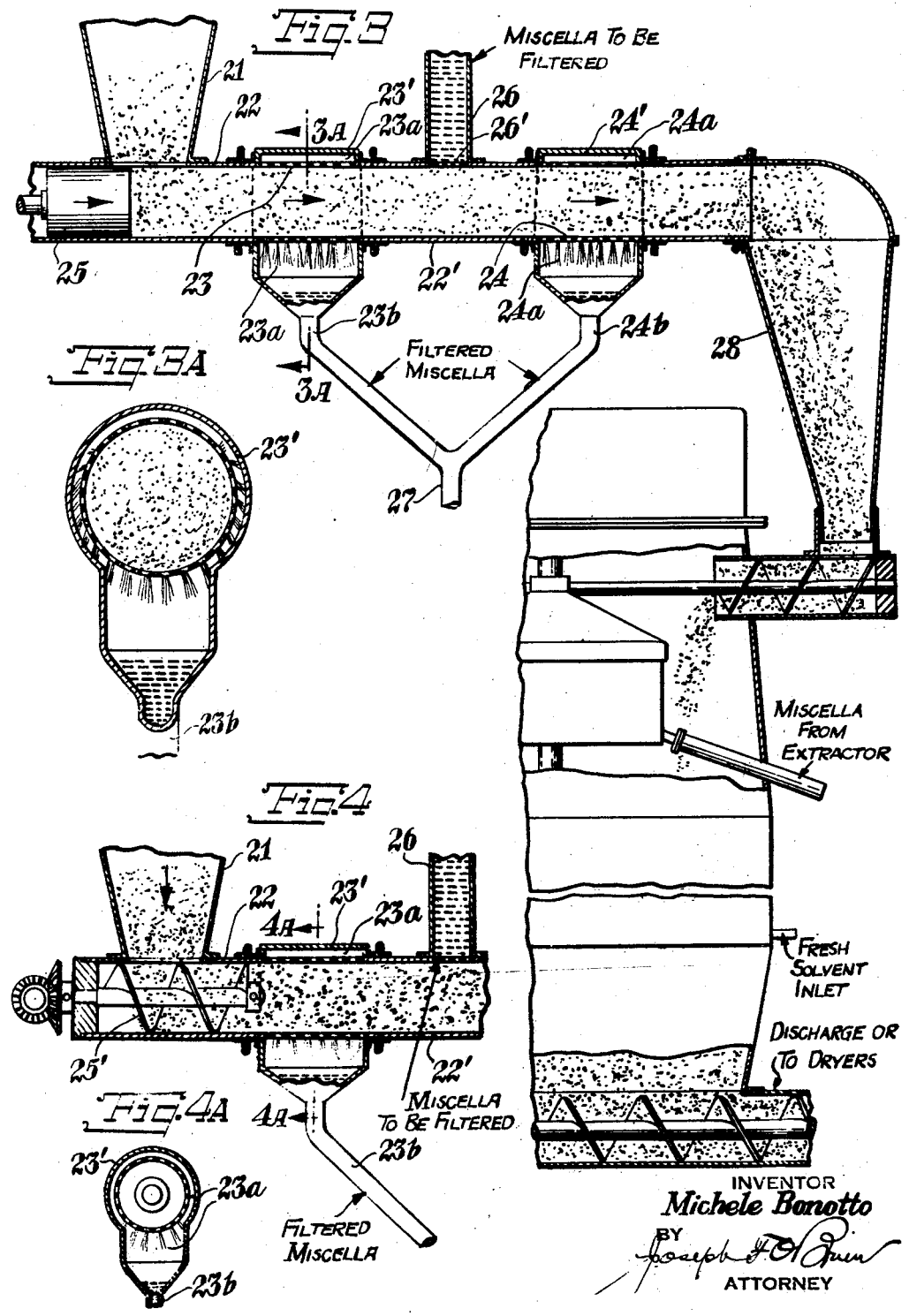
INVENTOR
Michele Bonotto
BY
Joseph F. O'Brien
ATTORNEY Patented Feb. 27, 1945

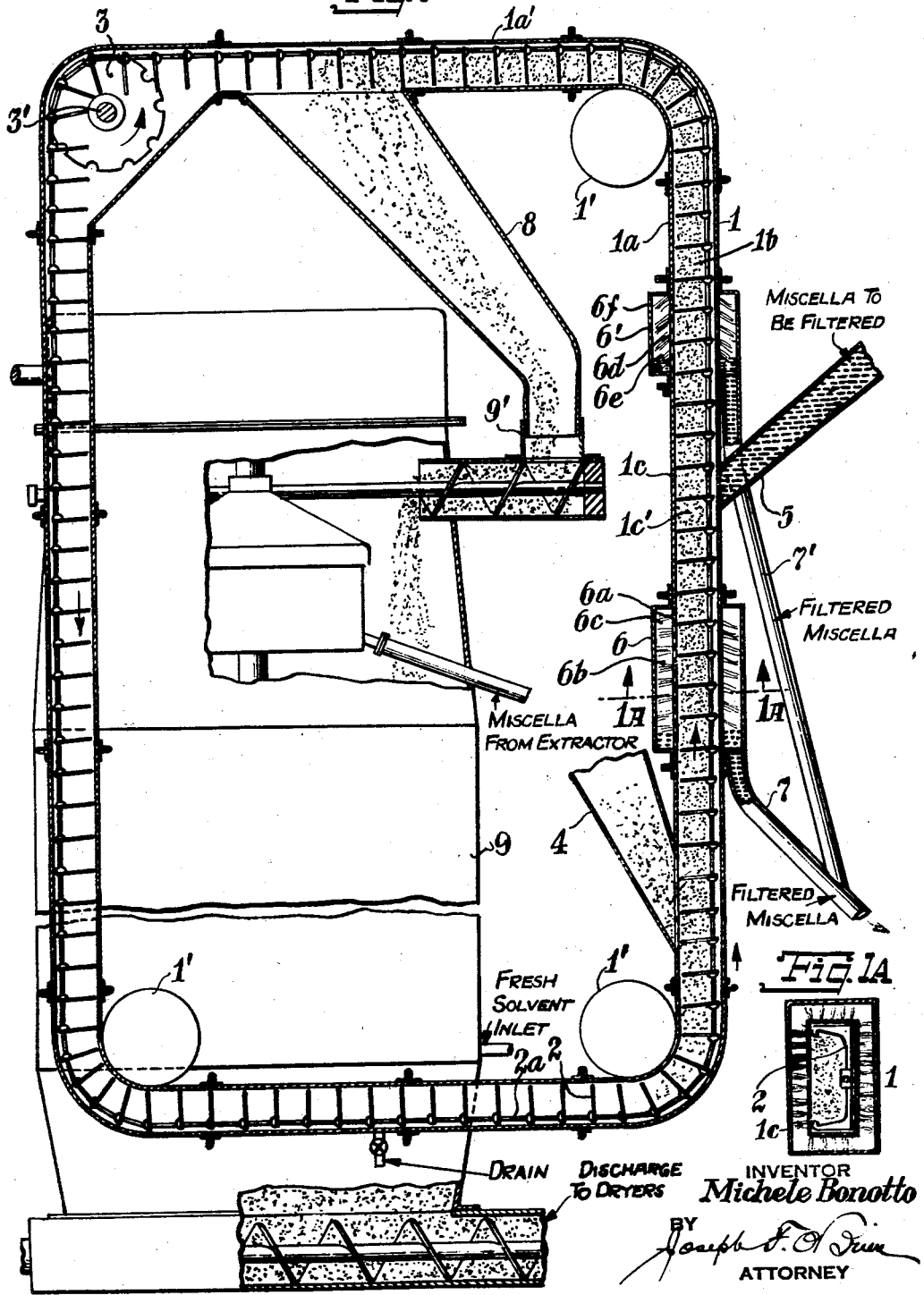

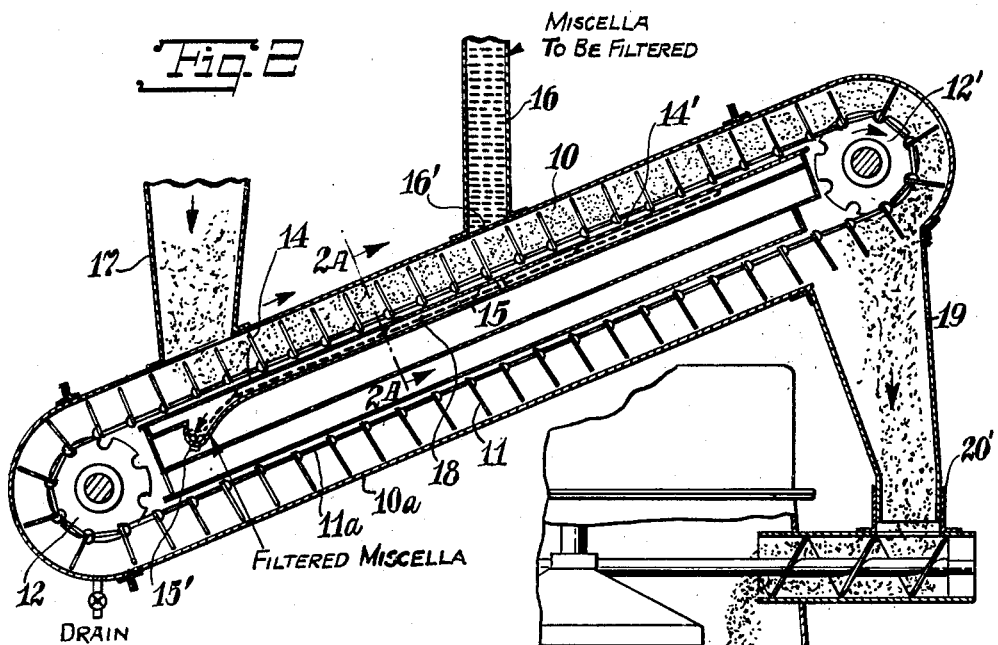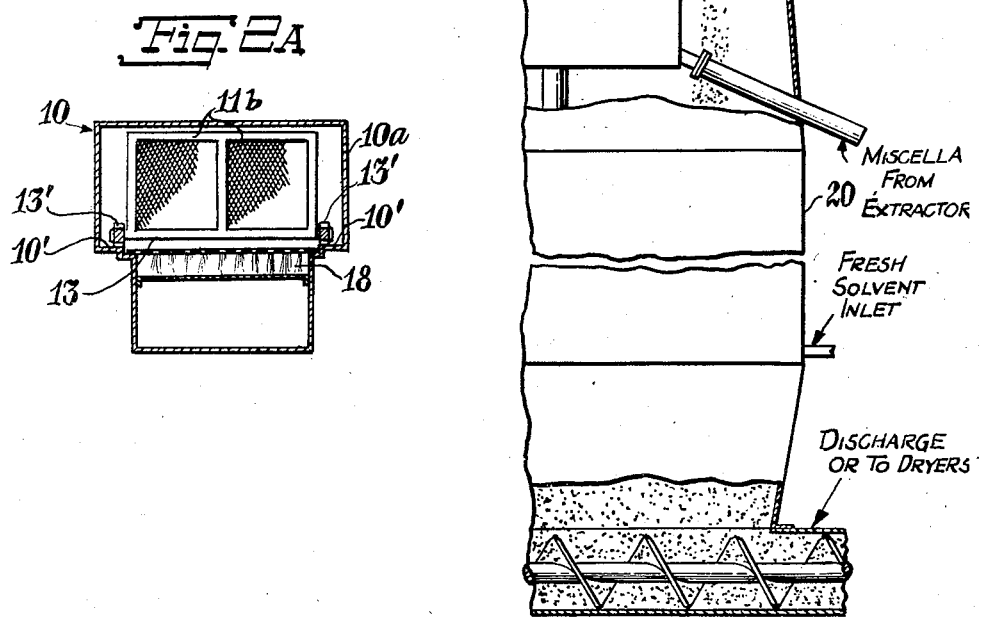

2,370,138

UNITED STATES PATENT OFFICE 2,370,138

PROCESSES AND APPARATUS FOR FILTERING MISCELLA AND LIKE MIXTURES THROUGH A FILTERING MEDIUM OF SOLID OIL-BEARING MATERIAL

Michele Bonotto, Evansville, Ind., assignor to Extractol Process, Ltd., Wilmington, Del., a corporation of Delaware Application June 17, 1939, Serial No. 279,650

2 Claims. (Cl. 210—141)

This invention relates to improvements in processes and apparatus for filtering miscella and like mixtures through a filtering medium of solid oil-bearing material.

In the extraction of oil from oil-bearing materials by the continuous, counter-current solvent process, for example, the resultant mixture of oil and solvent, which is called miscella, contains fine particles of solid matter composed of particles of the oil-bearing material. In such extraction of oil with solvent from vegetable seeds or from grains or nuts, the oil-bearing material (seeds or grains) is, in order to permit more ready access of the solvent to the cellular tissue, initially crushed and/or flaked. It has been found, in practice, that the flake form of such material offers the most surface to the action of the solvent, but during the flaking operation a certain amount of dust or fines is produced and the flaked material embodying this dust or fines is conventionally fed with the flaked material into the extraction apparatus or column and both flakes and fines are subjected to the extraction process with a solvent. In the subsequent extraction process the mixture of solvent and oil has a tendency to carry away the fines so fed as it leaves the extractors, the amount of fines thus carried away being in proportion to the efficiency of the strainer through which the miscella must pass before leaving the extracting apparatus.

Various forms of filtering apparatus are, in the common practice of the oil extraction industry, employed to remedy this condition, and it is conventional practice to limit the filtering or straining of the miscella at the exit of the extractor to the coarser particles contained in the miscella, the finer particles therein being removed subsequently in various ways, as for example, by proper settling, or by filtering through various types of filtering apparatus, or by a combination of both filtering and settling, it being understood that in that operation a loss of solvent also occurs. Furthermore, the evaporation of such solvent while the filter is open and being cleaned provides conditions which increase the possibility of accidents from explosions and fire. In some systems where the filter presses are used, if the solvent is of an explosive or inflammable nature, it has been necessary, in order to avoid danger, to insert a vacuum system to dry the filter before opening. In such cases, a really complicated arrangement results. In any event, these fine particles must be filtered out before the miscella is sent to the solvent-recovery apparatus or distiller where the solvent is separated from the oil and then led back into the extraction system. If the miscella is not thoroughly filtered before being led into the solvent-recovery apparatus, the said fine particles carried by the miscella will, during treatment of the said miscella, go into the evaporating system of the recovery apparatus or distiller, and there create trouble in the heat transfer section by the fouling of the heat transfer surfaces, thus making it necessary to frequently clean the heat-exchangers with the result that great economical losses occur in waste of steam, solvent and labor.

In batch systems of extraction, the miscella is filtered as it passes through the material during circulation through the extractor and an additional filtration is applied only as the miscella goes to the distiller. In the batch-system extraction, therefore, the importance of filtering apparatus is not very great because it is only necessary to filter out the few particles which occasionally pass through the filtering chamber of the extractor.

In continuous counter-current extraction processes, however, the filtration of the miscella is of far more importance, because a filtering action is not accomplished in the extractor. This is due to the fact that the solid material moves in counter-current to the solvent and is also due to the fact that in certain systems the conveying mechanism which moves the material in counter-current to the solvent has a stirring action. It is common practice to insert in such systems a filter or a series of filters between the outlet for the miscella from the extraction apparatus and the solvent recovery apparatus or distiller.

When settling of the miscella is used, difficulty is encountered in handling the solids which constitute the settlings and in recovering the oil and solvent with which the settlings are soaked.

Of the several filtering systems, the most generally used is the filter press, where a very complicated arrangement of apparatus is needed to avoid the escape of solvent vapors, it being understood that because of the peculiar characteristics of the components of the miscella, all such operations must be carried on in closed systems in order to avoid the escape of such solvent vapors. In most systems, a filter aid must be applied in the filter or incorporated with the miscella, thus necessitating the use of mixing and proportionating devices. Where a filter-aid of the diatomaceous earth-type is employed, the filtered solids which become mixed with the filter aid are not quite suitable to be returned to the main stream of extracted meal when such meal is to be used for feed purposes or for further processing. Furthermore, in filter-press systems, a complicated procedure is used to evaporate and recover the solvent from the cake before opening the filter presses, and periodical cleaning of such filter presses, and in fact of substantially all other filters, is necessary.

Any oil-extraction and filtering system which requires a separate operation for recovering the oil from the filtering material and eliminating and recovering the solvent from the same, is of doubtful value, especially when danger and cost of operation is considered.

My invention is intended to overcome all the difficulties hereinabove specified by the use of a continuous process and apparatus in which the oil-bearing material to be extracted (hereinafter called the "oil-bearing filtering material" or "process material") is, prior to its entry or feeding into the extraction cycle of the process, employed as a filtering medium for separating the fines from the miscella to clarify the same and also to carry into and through the extraction process, the fines which have been so separated. By "process material," I mean any granular, flaked or like material undergoing extraction treatment which is capable of serving as a filtering medium or material.

While my invention is more particularly adapted for use in connection with oil-bearing material and miscella, I do not wish to confine the same to oil-bearing material solely, as my process and apparatus may be employed also in connection with processes for the extraction of malt from malted grains, or sugar from sugar beets, with the use of water as a solvent, etc.

The importance of my present invention will be understood when it is considered that the oil-bearing filtering material, after the miscella has passed through it, is soaked with solvent and oil and contains fine particles of the material in process, all of which are valuable, and that such solvent and oil as well as the oil-bearing fine particles are automatically recovered when returned to the main stream or extraction column of the extraction system.

In all continuous filtering systems now in use of which I have knowledge, high pressures are used to force the liquid through the filtering medium in order to produce a compact apparatus and to utilize to the maximum extent the filtering surfaces, and in such systems it is necessary to keep the amount of filtering medium at the smallest quantity possible because the handling of filter cake, when used in a large volume, presents an expensive item in operation costs. The periodical necessity of renewing the fabric or wire filter mediums is also an item in operation cost.

In a system employing my present invention, the amount of filter cake used is not important because such filter cake or filtering medium is made up of material going through the extraction process, so the filtration is not a step per se, or a separate and distinct operation. There thus is no added extra operation cost and no additional cost with the exception of the first investment and the power required to pump the liquid to be filtered.

Another important advantage of my invention is that by passing miscella of a given concentration through flaked material which is to be extracted, such miscella will dissolve the free oil contained in the flakes, and will be further enriched, and this result will provide an operating economy in the distilling step of the extraction process.

In all the continuous filters known in the prior art, a filter medium is used, constituted generally of fabrics of various materials or wire screens of various construction. In some cases, on the surface of those fabrics or screens a cake is deposited which in itself may constitute the filtering medium. In this case, the fabric acts as a support and the deposited cake acts as a filtering medium in combination with the support. Sometimes, when the nature of the solids contained in the liquid to be filtered has a tendency to clog the fabric or screen, a so-called filter aid is added.

My present process thus includes the steps of providing, in a conduit, a filter section preferably comprising a central imperforate percolating portion and strainer or draining portions at opposite ends thereof, feeding into said conduit and filling said filter section with a body of process material to provide a filtering medium, feeding preferably under an optimum pressure, miscella into said filter section to percolate through said process material therein to clarify said miscella and load the interstices of the process material with fines, subjecting successive portions of the body of filtering process material to percolation of said miscella by continuously moving said process material through said filter section, collecting the filtrate through said filter section and passing the fines-loaded process material to an extractor.

With these and other objects in view, the invention comprises the combination of members and arrangement of parts so combined as to co-act and co-operate with each other in the performance of the functions and the accomplishment of the results herein contemplated, and comprises in one of its adaptations the species or preferred form illustrated in the accompanying drawings, in which:

Fig. 1 is an illustrative view, partly in section and partly in side elevation of a vertically-disposed apparatus embodying the preferred form of my invention;

Fig. 1A is a section on the line IA—IA of Fig. 1, looking in the direction of the arrows;

Fig. 2 is another illustrative view of a modified form of my invention, partly in section and partly in side elevation, the apparatus being arranged in inclined position and having another form of conveyor;

Fig. 2A is a section on the line 2A—2A of Fig. 2, looking in the direction of the arrows;

Fig. 3 is another illustrative view of another modified form of my invention, partly in section and partly in side elevation, the apparatus being disposed in horizontal position and having still another form of material-moving device;

Fig. 3A is a section on the line 3A—3A of Fig. 3, looking in the direction of the arrows;

Fig. 4 is a fragmentary illustrative view of still another form of modified apparatus embodying my invention, and Fig. 4A is a section on the line 4A—4A of Fig. 4, looking in the direction of the arrows.

Referring now to these drawings, I have shown four types of apparatus for carrying out my invention. Thus, in Figs. 1 and 1A, of the drawings, I have illustrated the preferred form of mechanical apparatus for carrying out my invention in which 1 is a conventional vertically-disposed rectangular conveyor apparatus, the casing 1ª of which is suitably supported in conventional manner by members 1'. This conveyor has ascending and descending legs or flights connected together by horizontal portions and comprising a continuous system of chain-conveyor elements 2 connected together by chains 2ª and moved by a drive wheel 3 driven by shaft 3' in conventional manner from any suitable source of power, not shown.

The casing 1ª is, as shown, composed of a series of sections, rectangular in cross-section, and connected together to provide liquid and vapor tight joints. In this preferred form of apparatus, I provide in the ascending leg or flight of the conveyor a filtering section 1ᶜ adjacent and preferably extending to opposite sides of a miscella inlet 5. This filtering section 1ᶜ comprises a percolating portion 1ᶜ' and draining portions 6, 6', one extending below the inlet 5 and the other positioned above the same. I then feed, from a feed hopper 4 into the ascending flight or leg of the conveyor 1 through said filtering section, a solid extractor-charging material from which oil is to be extracted by a suitable solvent, preferably of lower specific gravity than the material to be extracted. A solvent such as gasoline is used in the apparatus shown, though it will be obvious that a solvent of higher specific gravity than the material to be extracted may be employed in this apparatus if the same be suitably modified. The material to be extracted may comprise soy-beans, flax seed, cotton seed, meat scraps and other oil-bearing solid materials, which will preferably be treated in flaked form, and I will describe my invention with relation to flaked soy-beans, which when passed through the hopper 4 and moved into the section 1ᶜ, will form a filter bed therein as above stated. The flaked soy-beans are fed through the hopper 4 into and used as a filtering material in a filtering section of the conveyor which is filled to capacity and preferably moderately packed with such solid material, which material may be moved upwardly in the ascending flight or leg 1ᵇ. Miscella containing solid particles in suspension is fed to the flight 1ᵇ above the feed hopper 4 by a miscella conduit 5. The miscella is kept at a suitable constant pressure providing a proper hydrostatic head, or, if desired, such pressure may be applied by a pump, not shown. The liquid miscella will pass through the soy-bean flakes in the said ascending leg of the casing and percolate, leaving in the interstices of the packed soy-bean flakes the fine particles of solid material which had been in suspension in the miscella. As the deposit of fines in the interstices of the soy-bean flakes in the conveyor section increases, the miscella will encounter more resistance and if a hydrostatic head is employed the length of that hydrostatic head should be increased in proportion to the resistance to the flow until preferably the potimum pressure to which the liquid should be subjected is reached.

In an experiment, I found that when the passage of the liquid miscella through a filtering section of the solid filtering material retained in stationary position slows down to a point that it is almost stopped, the fines are heavily deposited in the interstices of the material in such a way as to cause resistance to further passage of miscella. By increasing the liquid column in the miscella conduit, more liquid can be forced through but, at the same time, the particles would be packed tighter under the hydrostatic pressure and thus render the passage of the liquid even more difficult. There is thus apparently an optimum pressure to which the liquid miscella may be subjected, and this optimum pressure will depend upon the kind of material, upon the length of the filtering section and upon the viscosity of the liquid miscella.

If now, by feeding process material comprising fresh soy-bean flakes through the hopper 4 and forcing, by the movement of the conveyor elements, the whole column of filtering process material upwardly through and above the filtering section, the said process material serving as a filter bed in said section and having the heavily-deposited particles, will be displaced and a new filtering bed of such material will be moved into place. A new coat of fines will be deposited in the interstices and a relatively small amount of liquid will be carried above the miscella feed conduit 5 due to the fact that the heavily-charged filtering material is progressing in that direction while the main body of miscella liquid from the miscella feed conduit will follow the line of least resistance and move downwardly toward the screened draining or outlet section 6 where it passes through the perforations of the screen portion 6ª which is arranged flush with the percolating section 1ᶜ' and into the space 6ᵇ between the said screen portion and an outside jacket 6ᶜ from which it is conducted through the pipe 7 to any suitable storage tank for filtered miscella. The relatively small amount of liquid miscella which is carried upwardly above the miscella feed by the process material passes through the screen portion 6ᵈ into the space 6ᵉ between the outside jacket 6ᶠ and said screen portion and is then, as shown, conducted by pipe 7' into the main miscella pipe 7. In same cases the last-mentioned draining portion 6' may be omitted.

It will be obvious that by continuously feeding into the conveyor through hopper 4 new material and continuously moving the column through the filter-section and past the miscella inlet at a speed which will cause a maximum loading of the process material with fines at the optimum pressure of miscella hereinabove referred to, the operation may be made continuous.

The process material is, after serving its filtering function, conveyed further upwardly in the ascending leg or flight 1ª and thence through the horizontal leg or flight 1ª' to an outlet hopper 8 connected with an inlet hopper 9' of an extraction tank 9 which per se forms no part of my present invention.

It will be obvious also that the oil-bearing filtering material, after the miscella has passed through it, is soaked with solvent and oil and contains fine particles of the material in process, all of which are valuable, and that such solvent and oil as well as the oil-bearing fine particles are automatically recovered when returned to the main stream or extraction column of the extraction system.

My continuous filter and processes are especially suitable to operate in connection with the continuous extraction apparatus of my Patent No. 2,156,236, granted April 25, 1939.

In addition to the first and second characteristics of my invention hereinabove specified, viz., that the material in process is used as a filtering medium prior to its entry into the process cycle; and that the fines separated by the filtration are carried with the material into the process, my invention provides the following possible variations or process modifications:

The oil-bearing material, as a filtering medium, is capable of being used: (a) in the form of the whole main stream and without change; or (b) a part of the main stream of the material may be diverted and used as it is; or (c) a part may be used and may be prepared in a special way before being used as the filtering medium; or (d) a component of the material to be processed may be separated and used as a filtering medium; or (e) a separated part of the material to be processed may be specially prepared to better suit the filter; or (f) a material acting as a filter aid may be mixed with the material going through the filter.

In all cases the filtering medium and the solid particles separated from the liquid miscella will be returned into the extraction process.

For example, consider a plant processing fifty (50) tons of soy-beans in twenty-four hours, using solvent:

In accordance with sub-division (a) all the beans coming from the flaking rolls may be used as a filtering medium before entering the extraction column; in accordance with sub-division (b) twenty per cent (20%), for example, of the material coming from the flaking rolls may be separated, by-passed through my filtering apparatus, and then conducted to join the main stream being fed to the extraction column or it may enter the extraction column at a lower level; in accordance with sub-division (c) the material separated as in (b) may be sifted in order to separate the fines, thus obtaining a stream composed of flakes of uniform size or particles to be sent into the filtering apparatus; in accordance with sub-division (d) the soybeans, before going to the flaking rolls, may be de-hulled and the hulls used in the filtering apparatus as a filtering medium and then sent to the column as in (b); in accordance with sub-division (e) the hulls separated as in (d) may be ground in order to have a desired uniform filtering material with special filtering effects; and in accordance with sub-division (f) the screenage obtained in cleaning soybeans may be ground or prepared and used alone, or in mixture with the material obtained in the foregoing cases, as a filtering medium and then caused to join the material going to the extraction column.

It will be understood that the progress of the process material should preferably be assured by some kind of drag or chain or similar conveyors, and in Figs. 2 and 2A, I have shown a device or arrangement in which the supply of process material is intended to be sub-divided before reaching the hopper 17 and one part thereof is made to progress above a perforated screen through which the miscella, after passing through the process material, seeps. In this case, a conventional inclined conveyor 10 is suitably supported in position and comprises a rectangular casing 10ᵃ having ascending and descending legs or flights connected together at opposite ends by arcuate portions extending around and passing over drive elements 12, 12'. A continuous system of chain-conveyor elements 11 connected together by chains 11ᵃ are moved by drive elements or wheels 12, 12' through the casing 10ᵃ in conventional manner, the drive wheels being rotated from any suitable source of power, not shown.

The conveyor elements 11 shown in Fig. 2A comprise perforated or screen-blade members 11ᵇ each mounted on a carriage axle 13 having, at opposite ends, rollers 13' travelling along tracks 10' formed inside the casing 10ᵃ at the lower edges of the top or ascending flight thereof. Said conveyor elements pass through a filter section in said upper flight having a lower screen or drain portion 14, an upper screen or drain portion 14' and an imperforate percolating portion 15 between the same, opposite which percolating portion at the top of the casing a miscella inlet conduit 16 is positioned. The entrance part of the miscella inlet is provided with a coarse-mesh screen 16' and suitable means is provided for the supplying miscella therethrough. A process-material hopper 17 feeds to the lower end of the casing process material which is conveyed past the miscella entrance 16' so that the miscella, under proper pressure or head will percolate through such material and seep through the screens 14, 14' upon the movement of the said process material.

It will be noticed that in all cases I have provided a solid partition such as 15 just opposite the miscella inlet in order to provide a greater depth of material through which the liquid is forced to pass to reach the lower perforated partition. An arrangement of that kind is helpful but is not absolutely necessary, as for some kinds of process-material, it will be possible to extend the perforated partitions to a position in front of or opposite to the miscella inlet.

In operation, the miscella percolates through the ascending process material, which is preferably moderately packed, and the greater part thereof, following the path of least resistance, will after percolating the process material seep through the screen portion 14 into the drain channel 18 positioned below the screens, while a minor part of the miscella will be carried forward upwardly with the process material and will seep through the screen portion 14' into said channel 18 which extends beneath the same. The filtered miscella passes out through conduit 15' to a still or a storage tank and the process material is conveyed around the arcuate section of the casing to a discharge conduit 19 which discharges into a hopper 20' of a suitable extraction tank 20.

In Figs. 3 and 3A, I have shown a horizontally-disposed construction embodying a mechanical application of my invention, in which the process material is fed continuously through a hopper 21 into a cylinder 22 which has a filter section comprising two perforated portions 23 and 24, at opposite ends of an imperforate percolating portion 22'. A piston 25, fitting the cylinder and suitably mounted and reciprocated beneath the hopper 21, pushes, with each alternate movement, the process material in the direction of the arrows through the filter section. A miscella inlet conduit 26 is connected with the cylinder 22 at the percolating portion 22' and has an additional perforated screen 26'. The miscella in the conduit 26 will be kept at a proper constant pressure by a hydrostatic head or by a pump. The perforated screen portions 23 and 24 are of a suitable construction that will not be clogged by the solid process material, but the movement of the process material on the surface of such screen portions will help to prevent such clogging, because by such movement, the particles deposited on the screen surface are wiped off and carried forward.

Upon each inward movement of the piston 25, the process filtering material in the filter-section which has acquired a high percolating resistance due to the deposit of particles from the miscella in the interstices thereof will be displaced, and the forward movement of the process material should be in proportion to the building up of the resistance area so that the higher the percentage of solids to be filtered from the miscella, the higher must be the speed required for the process material to progress, due consideration being given to the time required to provide a proper deposit of fines. The sections 23 and 24 heretofore described only as a portion of the cylinder 22 may be circular and surrounded by annular jackets 23', 24', having spaces 23ª, 24ª, through which the filtrate is collected and conveyed to the filtered miscella outlet conduits 23ᵇ, 24ᵇ, to a common outlet conduit 27, and the process material is discharged into hopper 28 to feed screw 29 of extractor 30.

In Figs. 4 and 4A, I have shown another modified form which is in all respects similar to the apparatus shown in Figs. 3 and 3ª except that a conveyor screw 25' is substituted for the plunger 25.

The operation of the apparatus shown in Figs. 3—3A and 4—4A will be obvious from the above.

Having described my invention, I claim:

1. The process of filtering miscella and like mixtures comprising the continuously feeding through a conduit having a filter section and filling said filter section with a body of initially flaked solids of an extractable given material to provide a filtering medium, continuously conveying said flaked solids in one direction feeding miscella embodying fines of the same material through said filter section under an optimum pressure to percolate through said flaked material in the opposite direction to clarify said miscella and load the interstices of the flaked material with fines, collecting the filtrate through said filter section and passing the fines-loaded flaked material to an extractor.

2. Apparatus for filtering miscella and like mixtures comprising a completely-enclosed material-conduit having a filter section extending upwardly and comprising an imperforate percolating portion and perforate draining portions on opposite sides thereof, a feed inlet for solid process material connected with said conduit at one side of said filter section, power driven means comprising a drag-chain conveyor composed of a continuous system of conveyor-elements connected together by chains and spaced from each other to provide carrying-spaces therebetween for continuously forcing in an upward direction a column of said solid process material from said material feed inlet through said percolating and draining portions of said filter section, a liquid feed inlet connected to said imperforate percolating portion between the ends thereof, means for feeding a liquid, under pressure, through said liquid-feed inlet, said material-conduit having at the other side of said filter section a material discharge outlet connected with an extractor, and means connected with said draining portions of the filter section for collecting and conducting away the filtrate.

MICHELE BONOTTO.